Patented Nov. 27, 1934

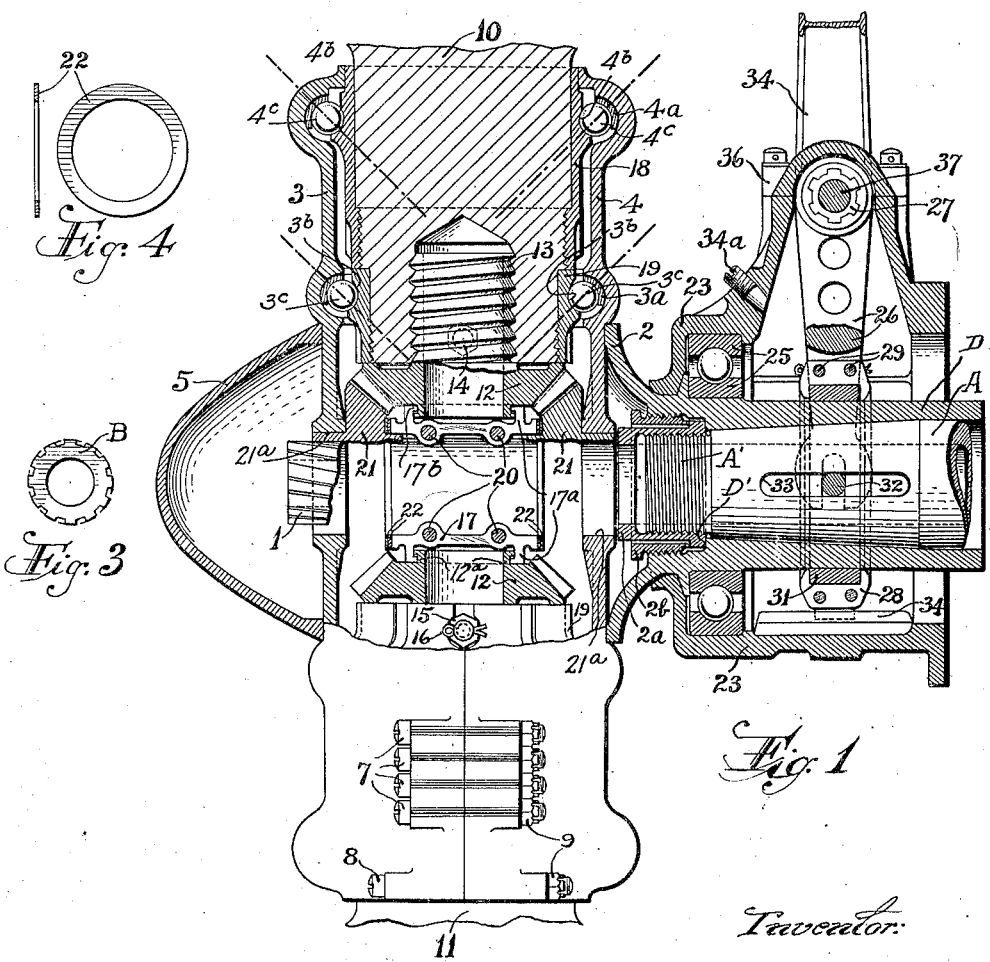

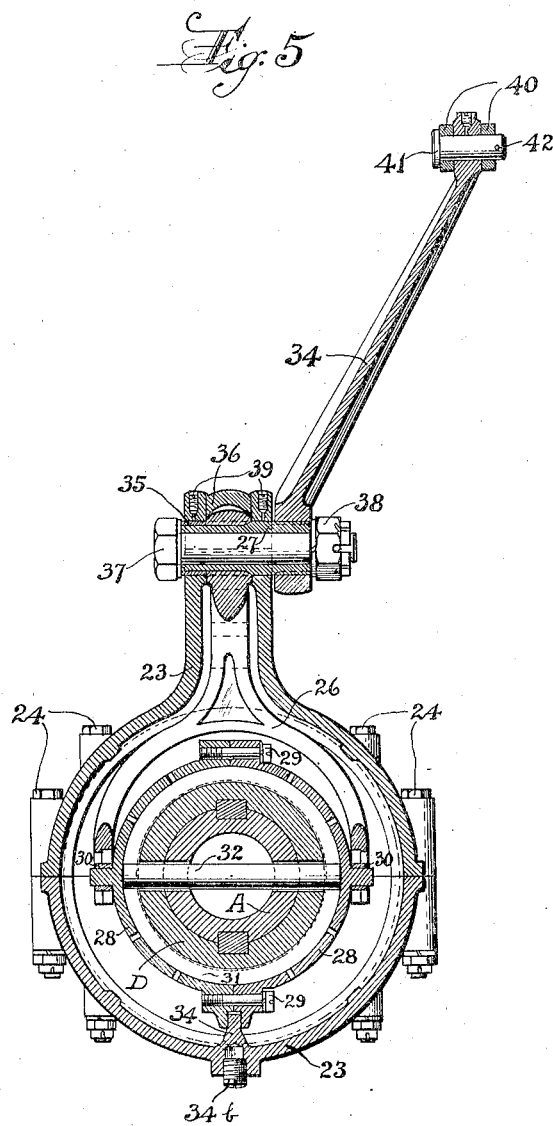

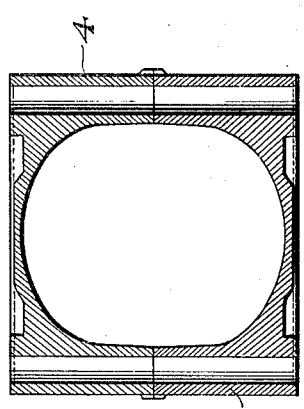
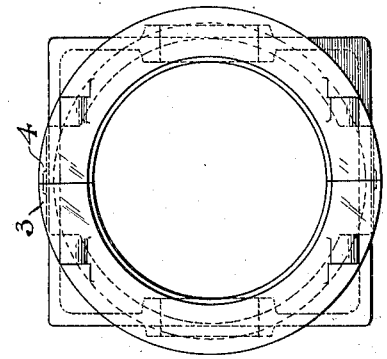
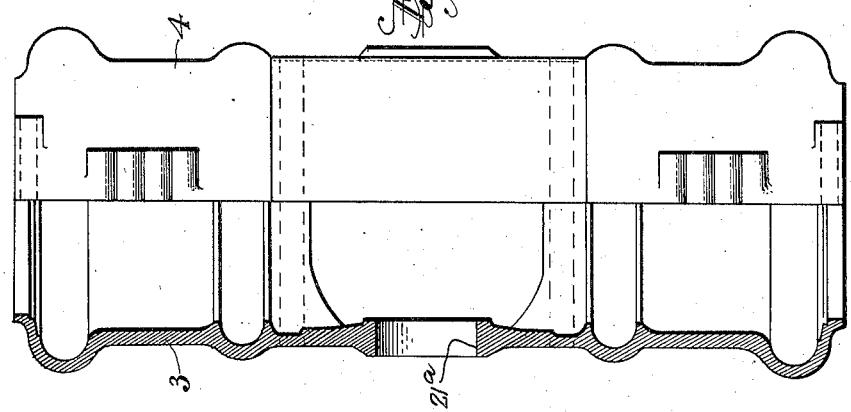
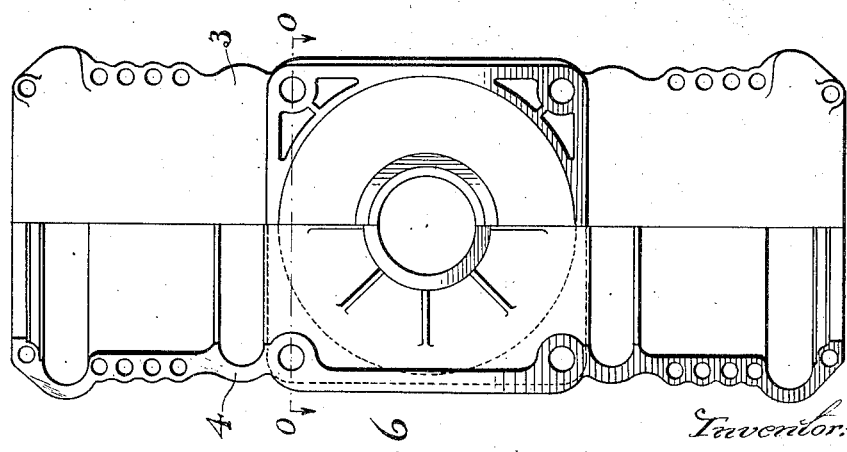

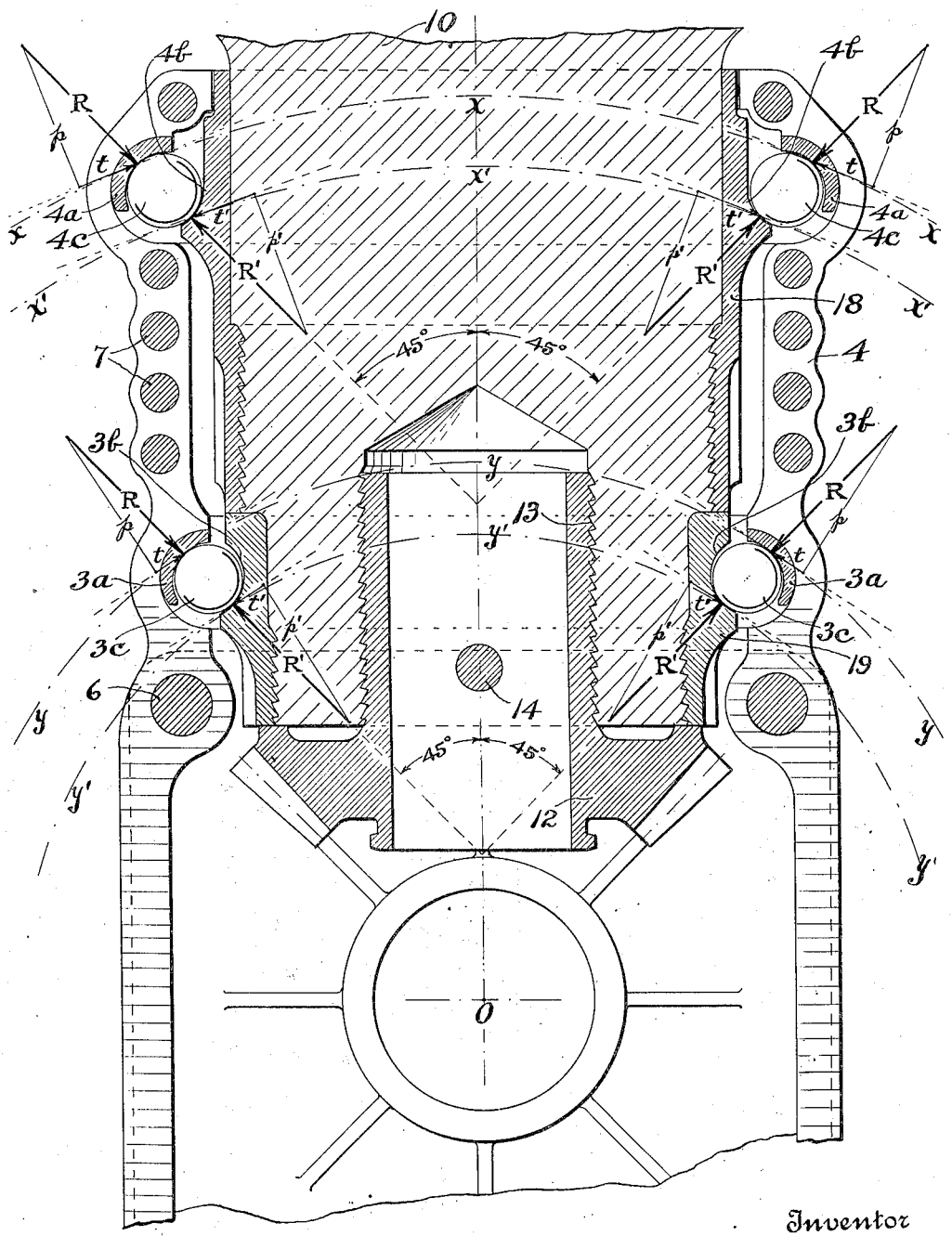

1,982,283

UNITED STATES PATENT OFFICE 1,982,283

VARIABLE PITCH PROPELLER FOR AIRCRAFT AND FOR VENTILATION

Emil A. Briner, East Orange, N. J., assignor to Aero Engineering Corporation, East Orange, N. J.

Application August 18, 1930, Serial No. 476,096

12 Claims. (Cl. 170—163)

This invention relates to improvements in variable pitch propellers especially adapted for aircraft, and of the general type disclosed in my copending application for Letters Patent Ser. No. 358,387, filed April 26th, 1929, which was a division of application for Letters Patent Ser. No. 244,829 filed January 6th, 1928.

This invention has for its principal object to provide an improved construction of hub casing for supporting the propeller blade roots and for housing the blade pitch shifting mechanism, together with improved means for uniting the hub casing in driven relation to a power shaft.

Another object of this invention is to provide an improved construction of anti-friction bearing supports in the blade hub and for the propeller blade roots adapted to efficiently sustain the aerodynamic, the vibratory, and centrifugal loads acting on the blades, while at the same time mounting the latter for quick and easy response to pitch shifting actuation.

Another object of the invention is to eliminate the damaging effects of irregular engine torque and vibration on the races of the blade bearings by loading them obliquely by centrifugal force (equivalent to static loading) thus effecting stabilizing components at the bearing contact points tangential to their orbits of rotation.

Another object of this invention is to provide a novel interlinking safety connection between the roots of the propeller blades, whereby the same may be mutually sustained, one by another, against accidental displacement from their supports under abnormal conditions; said interlinking safety connection being so arranged and devised in relation to the pitch shifting means as to provide lubricant retention means to serve the shifting splines of the latter.

Another object of the invention is to provide a complete blade unit with gear and ball bearings attached, to be conveniently demountable from the blade holder, so as to simplify inspection, balancing, etching for cracks, repair etc., such object to be attained without alteration in adjustment or pitch setting.

Other objects of this invention, not at this time more particularly enumerated, will become apparent in the following detailed description of the same.

An illustrative embodiment of the variable pitch propeller is shown in the accompanying drawings, in which:

Fig. 1 is in part a side elevation and in part a vertical longitudinal section of the variable pitch structure, with parts broken away to show the relation of internal mechanism thereof; Fig. 2 is a longitudinal section, taken in a plane at right angles to the plane of Fig. 1; Fig. 3 is a detail end view of a pitch shifting spline; Fig. 4 is in part a face view and in part a sectional view of a shim utilized between pitch shifting gears and the interlinking safety connection intermediate the propeller blade roots; Fig. 5 is a transverse sectional view through the actuating yoke lever of the pitch shifting mechanism; Fig. 6 is a detail view of the hub casing in end elevation, with parts broken away along a center line to show internal contours thereof; Fig. 7 is another detail view of the hub casing in side elevation, also with parts broken away along a center line to show a half section thereof; Fig. 8 is a detail transverse section, taken on line 0—0 in Fig. 6; and Fig. 9 is an outer end elevation of a blade root supporting branch of the hub casing. Fig. 10 is an enlarged sectional view of blade root and half hub, taken at the hub division line viewed from the left of Fig. 1, showing a diagram of ball bearing pressure lines and forces with propeller in operation.

Similar characters of reference are employed in the above described views, to indicate corresponding parts.

The reference characters 3 and 4 respectively indicate the two halves of a hollow hub casing, joined together along a central line or plane of division transverse to the axis of rotation thereof, and providing radially extending substantially tubular propeller blade-root supports, the walls of which are respectively provided with radially spaced annular channels or corrugations, in which are seated the outer races 3a and 4a of sets of ball bearings (see Fig. 1).

The central part of the hub casing is a relatively flat-sided hollow body portion providing heavy corner fillets suitable for coupling bolts. Said form gives wider and gentler distribution of engine torque to the radial arms, greater strength per unit of weight, and avoids the weakness incurred by the common practice of driving from an engine shaft inside the hub casing, yet without modifying a standardized engine shaft.

The reference character A indicates a power shaft, preferably having a tapered free end terminating in a threaded axial stub A'. Mounted upon the tapered free end of said power shaft A is a coupling sleeve D having a tapered bore to fit the taper of said shaft. Integral with the outer end of this sleeve D is a laterally projecting flange 2 to abut the center portion of said hub casing at the rearward side thereof.

Said sleeve D is provided with an internal annular shoulder D' which overhangs the threaded stub A'. Said sleeve D is securely affixed to shaft A by means of a nut 2a which screws upon the shaft stub A', and which engages the shoulder D' to thereby jam the sleeve upon the tapered end of the shaft. Said fastening nut 2a is locked against displacement by a lock-nut or collar 2b which preferably screws into an internally threaded portion of the sleeve body (see Figs. 1 and 2). Arranged to abut the center portion of said hub casing, at the forward side thereof, is a stream-line cap or nose 5. The base flange of said cap 5 and the flange 2 of coupling sleeve D are provided with bolt holes to align with corresponding registered bolt holes extending through the adjoined hub casing halves to receive a plurality of fastening bolts 6, one of which is shown in Fig. 2. In addition to the fastening bolts five registered perforate marginal shoulders are provided at the meeting edges of the tubular blade root supports of the hub casing halves to receive a plurality of auxiliary fastening bolts 7 and 8 which, together with the castellated nuts 9, additionally serve to retain the hub casing parts in assembled relation.

Mounted within the radial tubular supports of the hub casing are the roots 10 and 11 of the propeller blades, whereby the latter project radially from the hub casing structure. For the purposes of illustration but two blades are shown, although it will be obvious that the hub casing may be designed with additional supports for mounting more than two blades if desired. Securely affixed to the inner end of each blade root by its threaded stub 13 is a propeller shifting gear 12, the same being additionally secured by a transverse positioning key bolt 14, having a cooperating nut 15 and locking cotter pin 16. Said bolt 14 extends through the blade root and gear stub 13. Encircling and suitably secured to each blade root are metallic outer and inner sleeves 18 and 19, preferably made of heat treated steel. The outer sleeves 18 are provided with annular channels to form the inner races 4b of outer sets of ball bearings 4c, and, in like manner, the inner sleeves 19 are also provided with annular channels to form the inner races 3b of inner sets of ball bearings 3c. The sleeves 18 and 19 are preferably internally threaded to screw upon the blade roots, and are thus adapted to hold the blades against the stresses of centrifugal force occurring when the propeller is in operation.

With respect to each blade and its root there is thus provided at least two sets of radially spaced ball bearings, the outer races 4a and 3a of each set being disposed at an outwardly divergent angle relative to the longitudinal axis of the blade. As thus disposed, these ball bearings support the blade root at a plurality of spaced apart locations axially thereof, thereby efficiently holding the blade against lateral oscillation and tortional harmonic vibration, and, owing to the outwardly divergent angular relation of the races in which the balls run, are especially adapted to sustain a variety of load stresses to which the blades are subjected during operation. Mainly, these loads include end thrust, tending to tear the blade out by the roots; side thrust communicated by the rotation of the propeller shaft; vibratory reactions of the power shaft and cantilever reactions from forces acting upon the blades. In Fig. 1, the preferred designed pressure lines of these ball bearings are indicated by dash and dot lines, as taking a divergent angle of approximately 45 degrees relative to the blade axis, although a lesser angle, as e. g. 35 degrees could be employed as a lowest limit.

The outwardly divergent pressure lines, for a given blade, make up surface elements in a pair of imaginary cones, parallel to each other. Such lines intersect the annular curviform channels normal to the curved race seats of such channels. No other bearing pressure lines are present to disturb these parallel lines to cause movement, and hence destruction at the ball contacts or at the curved seats of their races when propeller is operating. Such destruction of the bearings results in the destruction of blades and hub. The slight compression of the balls at their points of contact, the yield in the annular corrugations, the stretch of materials between bearings in the hub, and in the blade unit, are all utilized in a unique compensated assembled bearing construction to insure harmonious practical operation in the blade setting. Such construction avoids crystallization of materials due to vibration and hence avoids the destruction of the propeller structure.

In the operation of the propeller the arrangement of the ball bearings according to my invention function to sustain various loads as follows:

The centrifugal load tending to tear the blade out by the roots is the dominant load, and operates to seat the blade root relative to the hub casing support in which it is mounted by firmly pressing the balls of each set thereof against the outer races 3a and 4a along the outwardly divergent pressure angle of approximately 45 degrees, thus accurately determining and centering the position of the blade in accurately seated relation to the hub casing structure, and so as to strongly resist minor or secondary forces tending to disturb such seated relation, whereby rigid support of the blade is assured while nevertheless leaving the blade free for pitch shifting turnability. The divergent angular lines of pressure set up by the described arrangement of the ball bearings tends to spread the thrusting reaction of the effective centrifugal load, whereby the effect of such spread assists greatly in absorbing side thrust as well as end thrust, and in resisting torsional oscillations and vibrations.

In some cases, approximately parallel sets of outwardly divergent lines of pressure, other than 45 degrees to the blade axis, may give satisfactory results. I limit the condition for satisfactory automatic loading of the blade bearings to outwardly divergent lines of pressure forming contact angles of 35 to 50 degrees with the blade axis. In applying this limitation, it must be construed to mean that either the inner or outer race of a three point bearing, or both races of a two point bearing, may contribute the 35 to 50 degrees pressure lines as the condition for scientifically loading such bearings automatically. I avoid chatter at the ball bearings by pressure lines producing a sufficient concentric clutching effect.

Fig. 10, shows diagrammatically four ball bearing pressure forces R, and four equal and opposite forces R', making an angle of 45 degrees with the blade axis, at the line of division of the hub and tending to compress the balls between the races. These pressure forces, R and R', are indicated by arrows, representing the magnitude and direction of the ball bearing pressures resulting from axial centrifugal force of the blade on the blade bearings with the propeller in rotation. It must be observed that these bearing pressures form a series of single oblique lines for any particular set of balls. The two sets form substantially parallel lines with each other making up axially spaced parallel cones when distributed about the blade axis.

In Fig. 10 are shown four arcs in dash and dot lines, $x$—$x$, $x'$—$x'$, $y$—$y$, and $y'$—$y'$. These arcs designate the orbits of the points of contact of the ball bearings with their races in the sectional view.

If we draw tangents to these arcs at the points of bearing contact shown by the arrows R and R' and drop four perpendiculars $p$, and four perpendiculars $p'$, from the tails of the arrows respectively to said tangents, we will form two series of four right angle triangles, $pRt$ and $p'R't'$ respectively, without and within the blade outline.

These right angle triangles have a short side indicated by four arrows $t$, and four arrows $t'$. Thus $t$ and $t'$ represent the magnitude and direction of the tangential components of the large substantially static forces, R and R', respectively. These tangential components are formed as a feature of the applicant's bearing construction to counteract irregular engine torque, tortional vibration, etc., and they are ample for the purpose. Note that these tangential components are thus derived from the centrifugal force and not from engine operation.

Another feature of obliquely obtaining these tangential components at bearings 4C, is shown at the outer arcs $xx$ and $x'x'$. There we have one pair of forces $t$ and $t'$ rotatively opposing another pair of forces $t$ and $t'$ at the other side of the blade. This means that the impressed tangential components (of the substantially static forces R and R') are equally capable of resisting tortional vibration in cantilever blade reactions, irrespective of the direction of engine rotation.

The same engineering principles apply to the forces $t$ and $t'$ on the inner bearings 3C, at the inner arcs $yy$ and $y'y'$, being in proportion to their distance from the shaft axis 0.

The above explanation applies to the utilization of the effect of the dominant centrifugal force alone, to automatically give a desirable amount of bearing holding power to seat the blade and prevent destructive wear at the ball bearing races due to vibration.

The pressure angle of 45 degrees might under different conditions of operation, vary from 35 to 50 degrees, but 45 degrees is the preferred angle.

This pressure angle of 45 degrees is chosen to increase the effect of the centrifugal load 41½ percent above the straight centrifugal load, thus increasing the ball compression, the bursting load on the hub joint, and giving exceptional rigidity to the blade setting. These large tangential components are induced forces created to overcome tortional and cantilever vibration.

Incidentally, the method of bearing construction illustrated, has the quality of rigidity without resorting to initial ball bearing pressures, or what is termed "preloading." The rigidity of my blade bearings is proportional to the square of the engine revolutions. Thus, if the engine revolutions are doubled, the rigidity of the ball bearings becomes 2×2, or 4 times as rigid. The 45 degree forces and their tangential components follow this proportion. Other types of bearings can easily be distinguished from mine (1st) by not being built in at least two similar sets for each blade, and (2nd) in not having sufficient tangential components derived from centrifugal force acting on the blade. Attempts in the prior art to distribute the blade load in separate longitudinal and lateral bearings (of the usual thrust and radial types) do not produce the effect of my bearings.

My quadrant form of separate outer bearings in a continuous ring are unique in fitting closely into sinuous corrugations of the split blade hubs, thus strengthening and reinforcing the hubs from the inside against bursting strains. The outer races of my bearings serve as retainers into which full circles of balls are sprung. No ball cage, or ball separator, is required for assembly or operation.

Preferably the power shaft A is, at least at its outer end portion, of hollow form to provide a bore to receive a preferably tubular member B which serves as a shifting rod upon which is fixed the shift splines 1 of the pitch shifting mechanism for the propeller blades, said splines affording the herring-bone arrangement disclosed in my hereinbefore mentioned copending application. If desired the shifting rod B may be reenforced with a liner element C. The hub casing is provided with bearing openings 21a in its forward and rear walls, which openings are axially aligned with said power shaft A and with the shifting rod B and shift spines 1. Journaled in these openings by their hub portions are the respective shift transmission gears 21 which operatively engage the shift splines and in turn mesh with the propeller shifting gears 12. Surrounding the shift splines and disposed between the shift transmission gears 21 is an interlinking safety connection 17, which, for short descriptive purposes, I denominate a safety link. This safety link is made in two semi-cylindrical halves or sections secured in operative assembled relation by connecting bolts 20. Projecting from exterior sides of the cylindrical body of said safety link 17 are circular collar flanges 17a having inwardly projecting annular interlinking fins 17b which respectively engage in annular channels 12a connected with the inward hub ends of said propeller shifting gears 12. There is sufficient play allowed between the walls of the channels 12a and the fins 17b that these parts remain out of contact when the propeller is in operation and the blade roots are in operative seated relation to the supporting ball bearings. Should there occur, through accidental causes or by reason of abnormal conditions, any tendency of the blades to outwardly escape from normal supported relation to the hub casing, then the fins 17b and channel walls will abut in interlocking relation thus tying the blades one to the other in mutually aiding resistance to such escaping movement thereof. When the propeller stands idle, the fins 17b will abut opposite channel walls, thus serving with the link body as a spacer or thrust block to definitely hold the blades and their gears in spaced apart relation and held against inward movement tending to displace opposed ball races of the ball bearing sets from normal ball retaining relation. The link body also serves as a spacer to hold the shift transmission gears 21 against axial movements under the thrusts of the splines 1, and in this connection the shims 22 may be interposed between said gears and the ends of the link body, or between said gears and the hub casing, so as to adjust the transmission gears in close meshed relation to the propeller shifting gears 12, thereby eliminating all play in such relations; such operation of the gears with no play tends to suppress or dampen fluttering of the blades when the propeller is operating under service conditions.

The hollow interior of the link body 17 is adapted to be packed with a suitable lubricating grease, which is thereby applied to the shift splines 1 to efficiently lubricate the latter in their operative engagement and relation to the shift transmission gears 21.

An improved arrangement and construction of manually controlled means for operating the pitch shifting mechanism is provided. Mounted exteriorly around the coupling sleeve D is a shift casing 23, the inner or rearward end of which is adapted to be bolted in fixed relation to the housing of the engine (not shown) which actuates the power shaft A. Preferably the casing 23 is made in halves secured together in assembled relation by bolts 24, and to reduce friction of the rotating coupling sleeve D relative thereto, the casing 23 is provided with a suitably arranged ball bearing set 25, as shown in Figs. 1 and 2; said ball bearing also furnishing an antifriction support near the propeller's center of gravity. The upper end of casing 23 is formed to provide an upward extension and bearing in which is arranged a transverse hollow fulcrum pin 27 to which is fixed a yoke lever 26 depending therefrom within said casing. Pivotally connected between the fork arms of said yoke lever 26 is a thrust ring 28, the same preferably comprising two halves bolted together by bolts 29, and having bushed studs 30 which are engaged by the bifurcate ends of the yoke lever fork arms. Arranged intermediate the coupling sleeve D and said thrust ring, and so as to be operatively embraced by the latter, is a sliding collar 31. This collar 31 revolves with the power shaft A and coupling sleeve D, being connected therewith by a crosshead pin 32 which extends through longitudinal registered slots 33 provided in opposite side walls of said shaft and sleeve. The crosshead pin 32 engages through the rearward end of the shifting rod B whereby the movement of the yoke lever 26 may be caused to longitudinally shift the rod B and splines 1 carried thereby so as to effect desired pitch adjustments of the propeller blades, when such movements are transmitted through gears 21 and 12. In order to resist any tendency of the thrust ring 28 to turn with the revolving collar 31, the lower member of casing 23 is preferably provided with an internal longitudinal guide flange slidably engageable by a female slide means connected with said thrust ring, thereby providing a keeper means 34. The hollow interior of the casing 23 is preferably supplied with lubricating oil, and to fill and drain the same, removable plugs 34a and 34b are provided at suitable locations in the walls thereof. The bearing for the fulcrum pin, 27 is completed by a detachable cap 36 connected with the upper extension end of the casing; a sleeve 35 being utilized, when the splined form of fulcrum pin, as shown, is employed. Attached to an exterior end of said fulcrum pin 27 is a control lever 34, these parts being held in operative assembled relation by a bolt 37 and nut 38. The bearing cap 36 is provided with normally plugged lubricating openings 39. Pivotally connected by a pin 41 and retaining cotter pin 42 to the free end of the control lever 34 is the forked end 40 of a rearwardly extending control rod or link, which extends to the pilot's cockpit, to be there coupled with suitable means manipulatable by the pilot for actuating the propeller blade shift mechanism at will.

Reverting to the hub casing structure, I have found it expedient to make the same as a forging of bronze or bronze alloyed with aluminum, which although producing a somewhat heavier structure than has heretofore been deemed desirable, nevertheless gives certain advantages, chief among which is less rigidity with the ability of such material to absorb vibration.

At present steel hubs are in common use. They are too stiff for forming a proper connection between comparatively flexible blades and a light flexible engine shaft. With a given size shaft and a given stress, the twist amplitude depends upon its shearing modulus of elasticity, about 12,000,000 instead of 30,000,000 for tension or compression, which influences the hub casing.

The hub acts chiefly as a double cantilever structure in tension and compression, which does not harmonize with a shaft sleeve whose function is chiefly torsion, when both are made of the same material.

The usual steel hub has a Young's modulus of elasticity in tension and compression of 30,000,000; whereas the same modulus for bronze is approximately 10,000,000, the latter value coming close to the shearing modulus of the steel shaft sleeve. Aircraft propeller blades in operation are flexible subject to a "tuning fork" type of vibration of periodic cycle, varying with the revolutions per minute of the driving engine power shaft. Such vibration, under conditions of severe load, contributes to the so-called "flutter" phenomena observed in propeller performance. The bronze hub casing in combination with flexible blades of different material and an abutting steel sleeve, tends to dampen or absorb such vibrations, as well as to reduce torsional vibration. Incidentally, the additional weight of the hub casing made of bronze, serves to provide balance wheel effects which further reduce vibration, and increase smoothness of movement, both as to the propeller and the driving engine.

As many changes could be made in the above described constructions, and many apparently widely different embodiments of the invention could be made without departing from the scope thereof, it is intended that all matter contained in the above description or shown in the accompanying drawings shall be interpreted as illustrative and not in a limiting sense.

The terms "controllable pitch" or "variable pitch", used herein, are in accordance with "Nomenclature for Aeronautics" page 65, report #240, approved by the National Advisory Committee for Aeronautics and published by U. S. Government Printing Office, Washington, 1926. The term "adjustable pitch" is narrower and different. It has well defined limitations and for any given adjustment, performs exactly like a corresponding solid propeller. The approved propeller terms are as follows:

*Controllable pitch or variable pitch.*—A propeller whose blades are so mounted that they may be turned about their axes to any desired pitch while the propeller is in rotation.

*Adjustable pitch.*—A propeller whose blades are so attached to the hub that they may be set to any desired pitch when the propeller is stationary.

These terms, and their relation to each other, must be so understood and construed in connection with my disclosure and claims.

I claim:

1. In a variable pitch propeller of the kind described, a hub casing having radial tubular extensions, said hub casing being divided into half sections meeting in a plane coincident with the axis of said extensions thereof, a coupling sleeve bored to receive a power shaft and having a flange to abut the rear side of said hub casing, a nose cap to abut the forward side of said hub casing, a plurality of through bolts for securing said nose cap, hub casing sections and coupling sleeve flange in assembled relation, said hub casing extensions having external registered lugs at their meeting edges, and additional fastening bolts secured through said registered lugs.

2. In a variable pitch propeller for aircraft, a hub casing having radial extensions, propeller blades having roots rotatably movable in said extensions, herring-bone pitch shifting splines axially movable in said hub casing, pitch shifting transmission gears actuated by said splines, and blade shift gears abuttably secured to the inner ends of said blade roots and actuated by said transmission gears; and a hollow safety link body concentric to said splines to also serve as a grease holder, said link body having means projecting therefrom for interconnecting the same to and between hub portions of said blade shift gears.

3. In a variable pitch propeller, a hub casing having radial extensions, propeller blades having roots rotatably movable in said extensions, a power shaft, a coupling sleeve secured to said power shaft, said coupling sleeve having a flange secured to said hub casing, pitch shifting mechanism within said hub casing operatively connected with said blade roots, said pitch shifting mechanism including a shift rod axially movable relative to said power shaft, coupling sleeve and hub casing, a crosshead pin connected with said shift rod, said power shaft and coupling sleeve having registered slots in opposite side walls thereof to pass said crosshead pin, a non-rotatable housing around said coupling sleeve, a yoke lever fulcrumed in said housing, and a thrust collar and slip ring connection between said yoke lever and crosshead pin.

4. The improvement in a variable pitch propeller of the kind described, comprising a hub casing, propeller blade units with antifriction bearings rotatable within said casing and retainable therein, means for varying the pitch of said blades, a hollow spacer between said units; supplementary blade retaining means integral with said spacer and interlockable with said blade units, but said interlockability normally out of engagement: so constructed and arranged that said spacer acts as a safety link in case of abnormal displacement of said blades.

5. In a variable pitch propeller, a split propeller blade casing comprising, a relatively flat-sided hollow body portion, a flanged sleeve thereon, radial hollow cylindrical arms, annular curviform ball race channels therein, bolts through the joint of said arms, and coupling bolts through said body portion and its adjacent flanged sleeve, said flanged sleeve rigidly fastened upon a power shaft, substantially as described.

6. In a variable pitch propeller, a hub casing with radial tubular extensions, and divided into half sections coincident with the axis of said extensions, a flanged coupling sleeve attached to an adjacent power shaft, a plurality of coupling bolts in said half sections and coupling sleeve; said hub casing extensions embodying external registered shoulders at their meeting edges, and auxiliary bolts through said registered shoulders.

7. In a variable pitch propeller, a split hub rigidly bolted together, pairs of arclike annular corrugations in said hub, blades, ball carrying blade sleeves, balls, and ball retaining rings rotatably attached to said blade sleeves at the root of each blade, said ball retaining rings shaped to an arclike sectional form registered in said annular corrugations.

8. In a variable pitch propeller, a split hub rigidly bolted together, a pair of arclike annular corrugations in said hub, blades, ball carrying blade sleeves, balls and ball retaining rings rotatably attached to said blade sleeves at the root of each blade, said ball retaining rings shaped to an arclike sectional form registered in said annular corrugations; so constructed and arranged that pairs of ball bearing flanges are formed on each blade root to respectively retain the balls on the sleeves and retain the blades in the hub, and to automatically load the bearings to avoid crystallization in materials, and propeller destruction when the propeller is in operation, substantially as described.

9. In a variable pitch propeller, a split hub rigidly bolted together, pairs of arclike annular corrugations in said hub, blades, ball carrying blade sleeves, balls, and ball retaining rings rotatably attached to said blade sleeves at the root of each blade, said ball retaining rings shaped to an arclike sectional form registered in said annular corrugations, so constructed and arranged as to prevent destructive chatter at the balls and to absorb the aerodynamic, vibratory, and the centrifugal loads received from the blades at the ball contact points, when propeller is in operation, hence attaining durability at such points in service.

10. In a variable pitch propeller, a split hollow hub rigidly bolted together, a pair of widely spaced annular corrugations of curved section in said hub, curved ball bearing outer races seated in said annular corrugations, complementary inner races rigidly attached to a blade root, balls between the races; said inner and outer races operably set in parallel relation to each other, and at outwardly divergent angular relation to the blade axis.

11. In a variable pitch propeller, a split hollow hub rigidly bolted together, a pair of widely spaced annular corrugations of curved section in said hub, curved ball bearing outer races seated in said annular corrugations, complementary inner races rigidly attached to a blade root, balls between the races, said inner and outer races operably set in parallel relation to each other, and at outwardly divergent angular relation to the blade axis; so constructed and arranged as to absorb aerodynamic, vibratory, and centrifugal forces operable on the blade with bearing pressure lines respectively, at each ball, and at outer ball race seats, normal to said annular corrugations of curved section, when propeller is in operation.

12. A convenient demountable blade unit of a variable pitch propeller, comprising a blade, a gear rigidly fastened to its butt end, a pair of ball race sleeves rigidly fastened circumferentially on the blade root, a pair of outwardly divergent ball retaining ring races complementary to said ball race sleeves, sets of balls held between the races; so constructed and arranged as a unit, to permit convenient assembly, inspection, blade etching, balancing and repair.

EMIL A. BRINER.